United States Patent [19]

Suzuki et al.

[11] Patent Number: 5,010,486
[45] Date of Patent: Apr. 23, 1991

[54] SYSTEM AND METHOD FOR LANGUAGE TRANSLATION INCLUDING REPLACEMENT OF A SELECTED WORD FOR FUTURE TRANSLATION

[75] Inventors: Hitoshi Suzuki; Shinobu Shiotani; Shinji Tokunaga, all of Nara; Tokuyuki Hirai, Yamatokoriyma; Yoji Fukumochi, Nara; Shuzo Kugimiya, Nara; Ichiko Sata, Nara, all of Japan

[73] Assignee: Sharp Kabushiki Kaisha, Osaka, Japan

[21] Appl. No.: 474,245

[22] Filed: Feb. 5, 1990

Related U.S. Application Data

[63] Continuation of Ser. No. 126,263, Nov. 27, 1987, abandoned.

[30] Foreign Application Priority Data

Nov. 28, 1986 [JP] Japan ................. 61-284487
Nov. 28, 1986 [JP] Japan ................. 61-284488

[51] Int. Cl.$^5$ ............................................. G06F 15/38
[52] U.S. Cl. ................................... 364/419; 364/200; 364/900
[58] Field of Search ................... 364/419, 226.4, 920.4

[56] References Cited

U.S. PATENT DOCUMENTS

| 4,381,551 | 4/1983 | Kanon et al. | |
|---|---|---|---|
| 4,456,969 | 6/1984 | Herzik | 364/419 |
| 4,468,754 | 8/1984 | Asada | 364/419 |
| 4,599,612 | 7/1986 | Kaji et al. | 364/419 |
| 4,623,985 | 11/1986 | Morimoto | 364/419 |
| 4,685,060 | 8/1987 | Yamano | 364/419 |
| 4,733,368 | 3/1988 | Morimoto | 364/419 |
| 4,783,758 | 11/1988 | Kucera | 364/419 |
| 4,787,038 | 11/1988 | Doi et al. | 364/419 |
| 4,791,587 | 12/1988 | Doi | 364/419 |
| 4,860,206 | 8/1989 | Kugimiya et al. | 364/419 |
| 4,864,502 | 9/1989 | Kucera et al. | 364/419 |

OTHER PUBLICATIONS

IBM Technical Disclosure Bulletin, vol. 23, No. 8, Jan. 1981, pp. 3897-3898.
IBM Technical Disclosure Bulletin, vol. 24, No. 10, Mar. 1982, pp. 5003 and 5005.
IBM Technical Disclosure Bulletin, vol. 23, No. 10, Mar. 1981, p. 4818.

Primary Examiner—Allen R. MacDonald
Assistant Examiner—Gail O. Hayes

[57] ABSTRACT

A translation apparatus is capable of translating a sentence from an original language into a sentence of a target language. In the translation apparatus, the sentence from the original language is analyzed by a computer so that the sentence of the target language may be produced. Prior to the translation, if the sentence from the original language contain a word or words which have not been registered in dictionaries for translation, such words can be collectively indicated on a screen or outputted by a printer. During the translation, if the sentence of the target language contain an inappropriate word or words, each of these words can be replaced by another desired word.

4 Claims, 9 Drawing Sheets

(NONE OF THE DICTIONARIES INCLUDES THE WORD WITH ∗S.)

(ENGLISH) (TRANSLATION)

《英文》　　　　　　　　　　　　　　《訳文》
-------------------------------------------------
11  The programming Language the XY-12
    34 uses is BASIC Language.
12  The BASIC Language, a dialogue          《*付きの単語は辞書にありません》
    Language for scientific
    computations, is said to be the
    easiest to understand and use
    among a variety of programming
    Languages and is widely used by
    people ranging from *beginers*
    to experts with programming.

(NONE OF THE DICTIONARIES INCLUDES THE WORD WITH *S.)

Fig. 9

(ENGLISH WORDS) (LIST OF UNREGISTERED WORDS) (SENTENCE NUMBER) (WORD NUMBER)

未知語リスト

英単語　　　　　　　（文番号, 単語番号） beginers　　　　　　（12, 34） parcheesi　　　　　　（1, 7）

未知語数（異なり）＝ 2件
　　　　　　　未知語数（総計）　 ＝ 2件

(CUMULATIVE TOTAL NUMBER OF UNREGISTERED WORDS)

(TOTAL NUMBER OF DIFFERENT UNREGISTERED WORDS)

Fig. 11

(INPUT OF THE EQUIVALENT)
(NUMBER OF THE WORD TO BE REPLACED)

Fig. 12

(TRANSLATION)
(REGISTERING OF THE WORD PREFERENTIALLY USED)

(COUNTERMAND)
(NOUN)
(ADVERB)
(ADJECTIVE VERB)
(ADJECTIVE)
(VERB)
(PART OF SPEECH)

(INPUT OF THE EQUIVALENT)
(NUMBER OF THE WORD TO BE REPLACED)

Fig. 12

(TRANSLATION)
(REGISTERING OF THE WORD PREFERENTIALLY USED)
(COUNTERMAND)
(NOUN)
(ADVERB)
(ADJECTIVE VERB)
(ADJECTIVE)
(VERB)
(PART OF SPEECH)

SYSTEM AND METHOD FOR LANGUAGE
TRANSLATION INCLUDING REPLACEMENT OF
A SELECTED WORD FOR FUTURE
TRANSLATION

This application is a continuation of application Ser. No. 07/126,265 filed on Nov. 27, 1987, now abandoned.

BACKGROUND OF THE INVENTION

1. Field of the Invention

The present invention relates to a translation system and, more particularly, to a language translation apparatus which performs translation from one language (original language) to another language (target language) by using a computer.

2. Description of the Prior Art

There have been proposed a number of translation apparatus which can translate a sentence or sentences from a source or original language to a target language.

In the conventional translation apparatus, however, an unregistered word contained in an inputted original sentence can be found out only when the original sentence is being translated by the translation apparatus. It is to be understood here that the unregistered word is a word which has not been registered in any dictionary to be used during translation process, a word whose spelling is erroneously inputted or the like. Accordingly, the conventional translation apparatus contain the following disadvantages:

(a) In the case where the translation is carried out in an interactive mode, the translation process is intercepted whenever an unregistered word is found out and such a word is necessarily required to be registered in a user dictionary, thus resulting in that not only the translation is delayed, but also a loss takes place during the operation of the apparatus.

(b) In the case where the translation is carried out in a batch processing mode, the inputted sentence including the unregistered word is not correctly translated or it is left as is, without any translation. Accordingly, upon confirmation of a translation result, the translation process must be carried out again.

In the former, case (a), when a translation order has been optionally given to a certain sentence, the translation process is carried out and the unregistered word is found out during dictionary look-up and morphological analysis. Accordingly, it is impossible to further continue the process because the translation process is caused to stop. Thereafter, an operator takes measures against this, for example, by registering the unregistered word in a user dictionary, thereby causing him to give the translation order again.

In the latter, case (b), the translation process is carried out with respect to all of the sentences contained in a text to which the translation order has been given. In this event, the sentence including the unregistered word or words is not translated due to the same reason as described above in the interactive mode, and a subsequent sentence becomes the next object of the translation process. Upon completion of the batch processing of the translation, the operator must register the unregistered words contained in the text into the user dictionary, word-by word. Furthermore, the operator is requested to find the sentences which have not been translated due to the presence of the unregistered words and to give the translation order again.

As described so far, a time loss takes place in giving the translation order again or in finding out the sentences which have not been translated due to the presence of the unregistered words, thus intercepting the smooth translation to be executed by the operator.

In addition, in the conventional translation apparatus, the translation is carried out in a manner such that the words contained in the inputted sentence are each translated only by using an appropriate equivalent contained in a group of words which have already been registered into any dictionary for translation.

In other words, when a certain word contained in a translated sentence is required to be replaced by a new desired one and if the group of registered words corresponding to the former contains no desired word, it is necessary to modify the dictionary or dictionaries by registering such a word into the user dictionary or by editing one of the other dictionaries.

An explanation will be made below, for example, with reference to an English-to-Japanese translation system.

When an English sentence "This computer has a 64K byte memory" is inputted into the apparatus, a translation 「このコンピュータは 64K バイトの記憶を持っている。」 is outputted from it.

In the field of computer, since the English word "memory" is generally translated into a Japanese equivalent 「メモリー」, a function for replacing one word by another is employed.

In an ordinary dictionary, however, since the English word "memory" contains the Japanese equivalents 1. 記憶，記憶力、 2. 思い出、 3. 記憶期間 only, the aforementioned, function is of no service to the translation in this case. Accordingly, it becomes necessary to make use of the function of the user dictionary or that of dictionary edit.

SUMMARY OF THE INVENTION

The present invention has been developed to substantially eliminate the above described disadvantages inherent in the prior art translation apparatus, and has for its essential objective to provide an improved translation apparatus which is capable of finding all of the unregistered words contained in an inputted sentence or sentences prior to the translation process and of collectively registering all of them together into a user dictionary, thereby readily grasping the whole translation process and shortening its operating period.

Another important objective of the present invention is to provide a translation apparatus of the above described type, which is capable of readily replacing one equivalent by another desired one in a translated sentence. This function of the present invention can be achieved by a construction that allows a new desired equivalent to be inputted during the same phase as that of the translation process, even when a selected word in the inputted sentence in an original language is deemed to be correspondent to none of the equivalents outputted from a dictionary in a target language.

In accomplishing these and other objectives, according to one preferred embodiment of the present invention, there is provided a translation apparatus for translating a sentence from an original language into a sentence of a target language, which includes a verifying means for verifying all words contained in an inputted sentence with respect to dictionaries for translation, prior to translation process, and an output means for outputting each word which has not been registered in the dictionaries, on the basis of a result obtained by the verifying means.

In another aspect of the present invention, the translation apparatus includes indicating means for indicating a selected word contained in the inputted sentence, output means for outputting contents of a dictionary corresponding to the selected word, an input means for inputting a new desired equivalent corresponding to the selected word, replacing means for replacing an equivalent contained in a translated sentence and corresponding to the selected word by another desired equivalent contained in the dictionary and outputted by the output means or by the new desired equivalent inputted by the input means, and means for preferentially using the desired equivalent replaced by the replacing means in the translation process.

BRIEF DESCRIPTION OF THE DRAWINGS

These and other objectives and features of the present invention will become apparent from the following description taken in conjunction with a preferred embodiment thereof with reference to the accompanying drawings, throughout which like parts are designated by like reference numerals, and in which.

DETAILED DESCRIPTION OF THE PREFERRED EMBODIMENT

Figure 1:
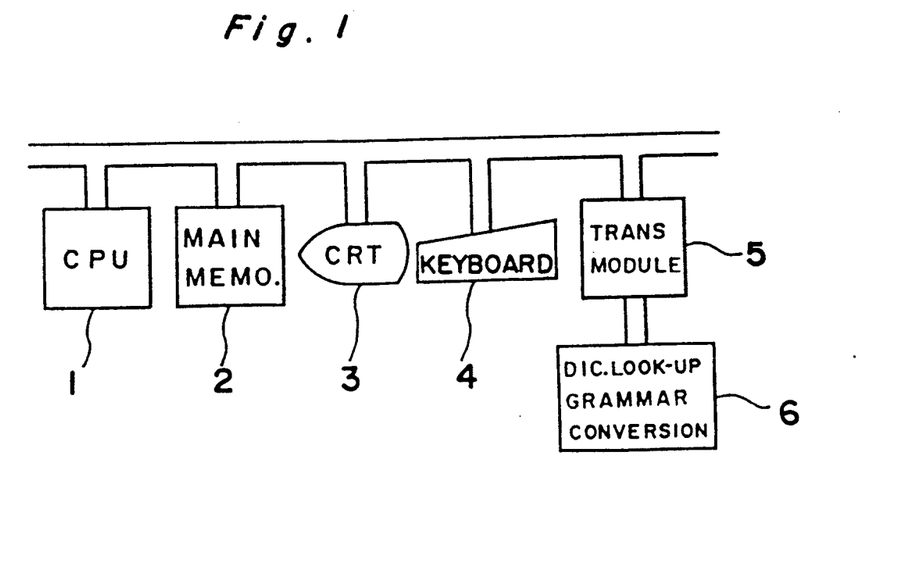
FIG. 1 is a block diagram of a translation apparatus according to a preferred embodiment of the present invention.

Referring now to the drawings, there is shown in FIG. 1, a block diagram of a language translation apparatus according to a preferred embodiment of the present invention, which performs translation from one language (original language), such as English, to another language (target language), such as Japanese, by using a computer. The translation apparatus comprises a central processing unit (CPU) 1 for carrying out the translation, a main memory 2 for storing programs to be used in the CPU 1, a display 3 of a cathode-ray tube (CRT) for indicating necessary display required for the translation, a keyboard 4 for inputting necessary information required for translation process, a translation module 5 for storing such information, and a table 6 including dictionaries for the translation, a grammar text and a conversion text to be used during conversion between tree structures. It is to be noted that an optical character reader (OCR) is occasionally used as an input unit depending upon a translation system.

The above dictionaries for the translation include a basic dictionary having basic vocabularies, a technical dictionary having technical vocabula,ries, a user dictionary having a vocabulary by registered by the user.

Figure 2:
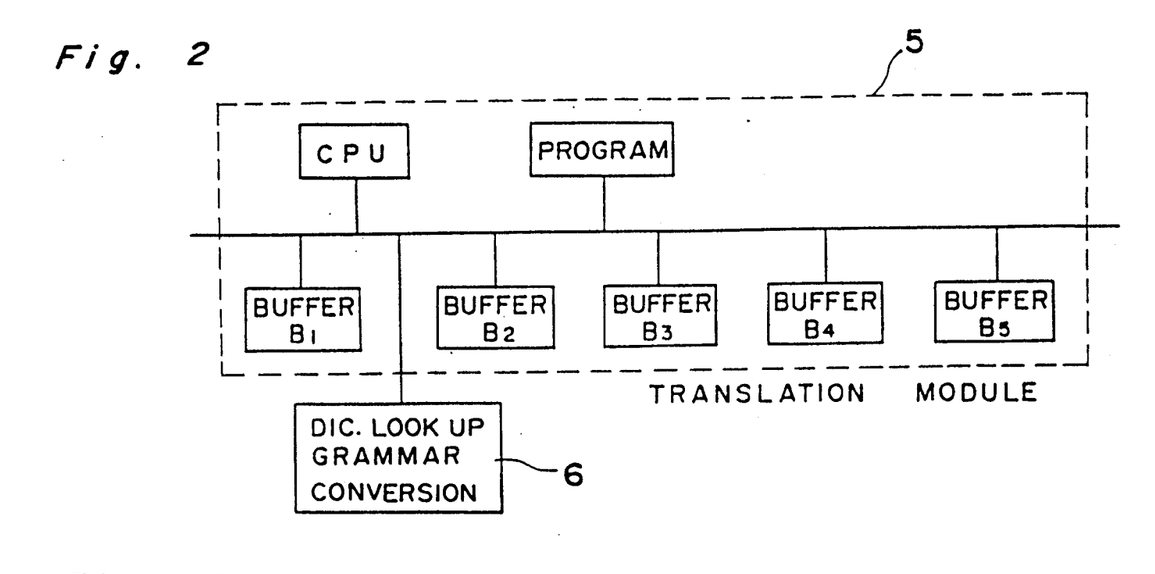
FIG. 2 is a block diagram showing a detail of a translation module shown in FIG. 1.

FIG. 2 shows a hardware structure of the translation module 5 which comprises five buffers B1, B2, B3, B4, and B5,; a CPU; and a program memory for the translation. These five buffers B1 through B5 are provided for storing analysis results in different levels during the translation process, as will be explained below.

Figure 3:
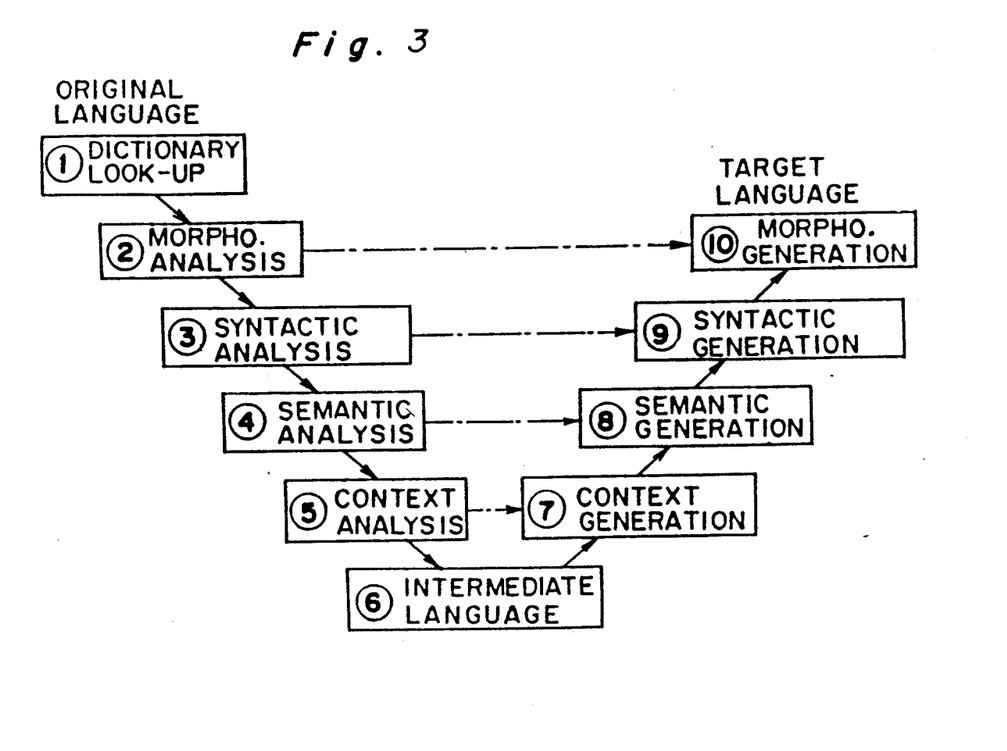
FIG. 3 is a diagrammatic view showing the process for translating from, one language to another language.

A general idea on how the computer translation is carried out from one language to another language will be explained. As shown in FIG. 3, a sentence of the original or source language is processed so that a word-to-word dictionary look-up is obtained, and then the source language is analyzed in various steps, which are: morphological analysis; syntactic analysis; semantic analysis; and context analysis, to obtain an intermediate language which does not belong to any existing language, but is understood only by the computer. The steps carried out in each analysis will be further understood from Table 1 shown below.

TABLE 1

| Analysis Steps | Analysis |
| --- | --- |
| Dictionary look-up and morphological analysis | Find a word in the dictionary and provide its translation as well as other word information, such as verb, noun, adverb, adjective, plural, singular, tense, person, etc, according to the stored grammar text. |
| Syntactic analysis | Find a relationship between the words, clauses and/or phrases to determine one or more possible sentence constructions, each analyzed in a form of the tree structure. |
| Semantic analysis | Select one sentence construction which is most appropriate from the viewpoint of the meaning. |
| Context analysis | Understanding the theme of the sentence and clarifying the vague expressions. |

After the intermediate language has been obtained, the computer forms and generates a sentence in the target language through the steps of: context generation; semantic generation; syntactic generation; and morphological generation, which are similar to the above described analysis.

The above described method of the computer translation is called a pivot method in which the procedure follows the steps formulated by solid line arrows shown in FIG. 3 to obtain-the intermediate language, and then, the target language is obtained finally.

Another method is called a transfer method in which the procedure takes a short cut step formulated by one of the chain line arrows to complete the translation without obtaining the intermediate language.

According to the embodiment disclosed herein, the translation is carried out in the transfer method, as explained above in connection with FIG. 3, with the analysis done as far as the syntactic analysis. Alternatively, it is possible to use the pivot method. Furthermore, the transfer method with the analysis done up to different levels can also be used.

Figure 4:
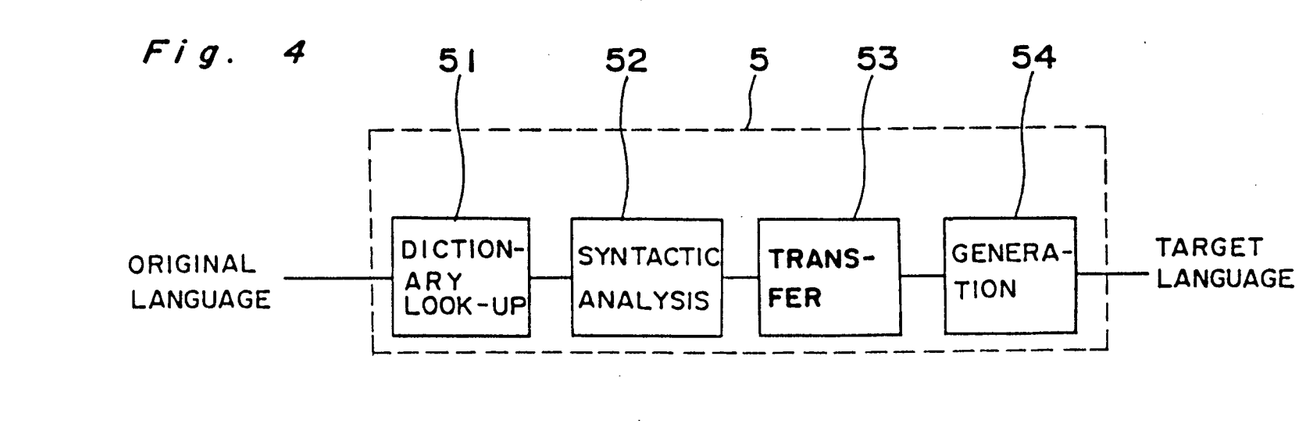
FIG. 4 is a block diagram showing the translation process employed in the embodiment of the present invention.

There is shown in FIG. 4, a software structure of the translation module 5, which comprises four portions such as a dictionary look-up and morphological analyzing portion 51, a syntactic analyzing portion 52, a language transfer portion 53 and a target sentence generating portion 54.

Figure 5A:
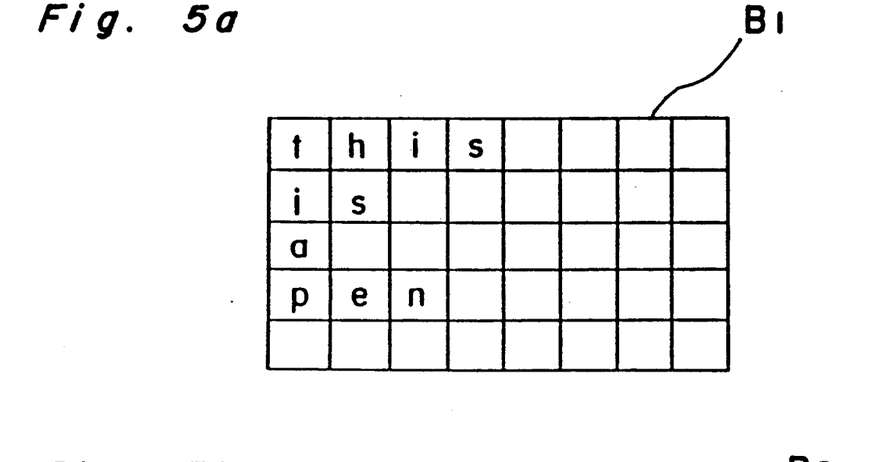
FIGS. 5a to 5e are diagrammatic views showing data to be stored in buffers shown in FIG. 2.
Figure 5B:
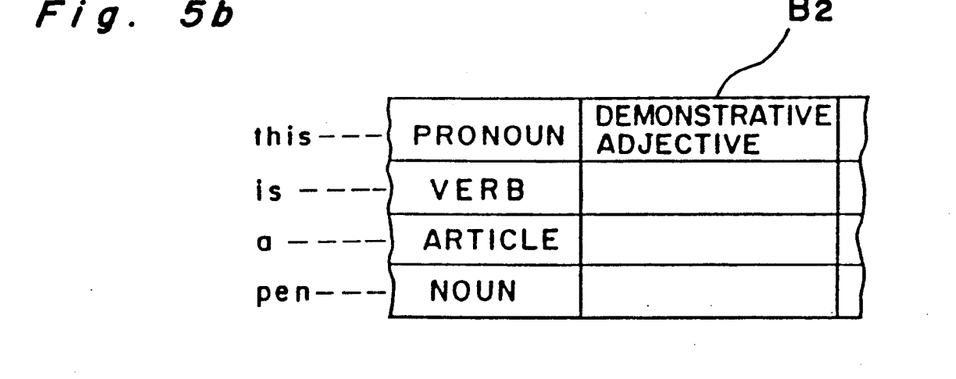
Figure 5C:
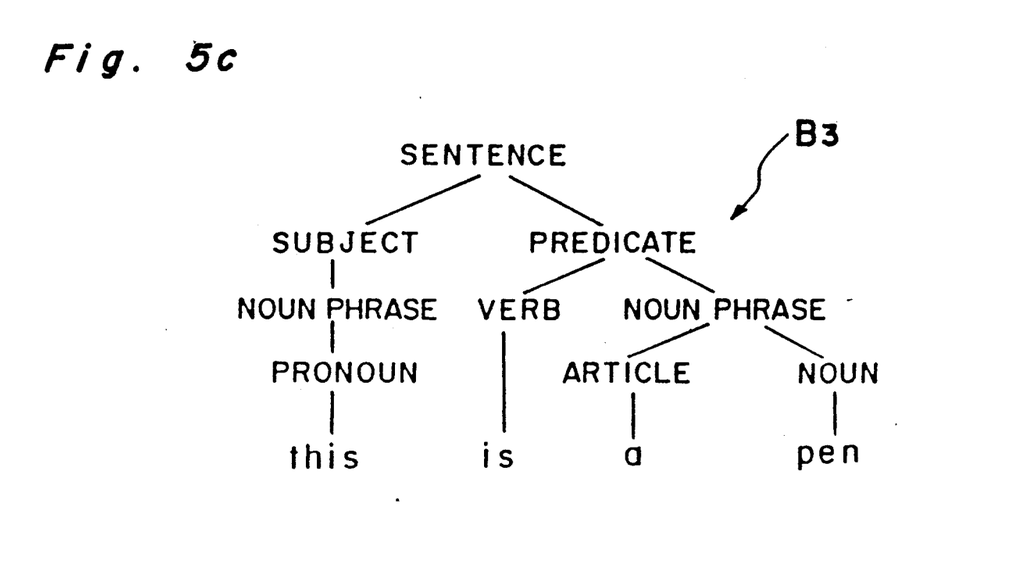

It is now assumed that an English sentence "This is a pen." is inputted to the apparatus to be translated into Japanese. The original sentence is initially read into the buffer B1 in which words constituting the sentence are separated from each other and sequentially stored in different areas, as shown in FIG. 5a. Necessary information with respect to each original word is obtained in the dictionary look-up and morphological analyzing portion 51 to be inputted into the buffer B2 shown in FIG. 2. An example of the information such as a part of speech stored in the buffer B2 is shown in FIG. 5b. Although the word "this" can be either adjective, pronoun, or adverb, it is determined as a pronoun in the syntactic analyzing portion 52. Thus, various data or information in association with the tree structure with respect to each word is inputted into the buffer B3, as shown in FIG. 5c. In this event, an analysis shown in Table 2 below is carried out with the necessary information derived from the grammatical information of the Table 6 (FIG. 2).

TABLE 2

| UNIT | ELEMENTS DEFINING THE UNIT |
| --- | --- |
| Sentence | Subject and Predicate |
| Subject | Noun phrase |
| Predicate | Verb and Noun phrase |
| Noun phrase | Pronoun |
| Noun phrase | Article and Noun |

By the above table, each unit can be analyzed in elements. For example, a sentence can be analyzed into a subject and a predicate.

Figure 5D:
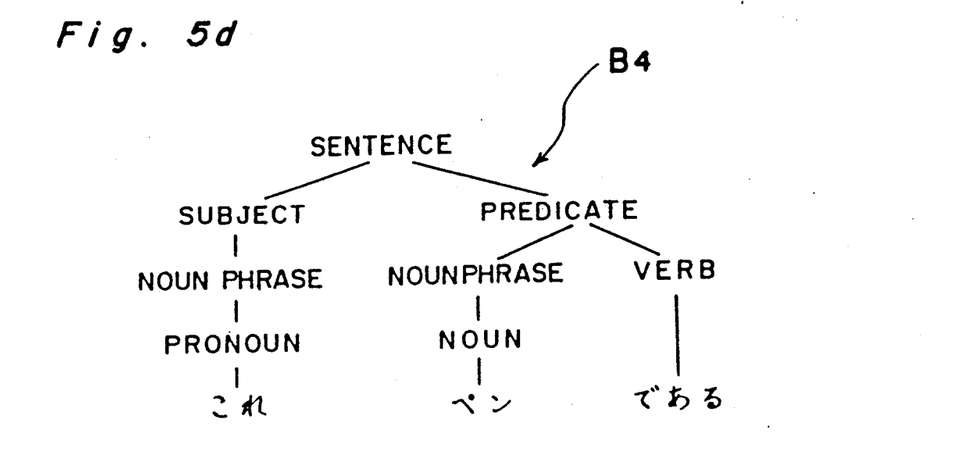

Then, in the language transfer portion 53, the analysis is carried out, similarly as in the syntactic analyzing portion 52, in accordance with a conversion rule between the tree structures, for example, from the tree structure based on a English language to the tree structure based on the Japanese language to obtain a new tree structure, as shown in FIG. 5d, which is stored in the buffer B4.

Figure 5E:
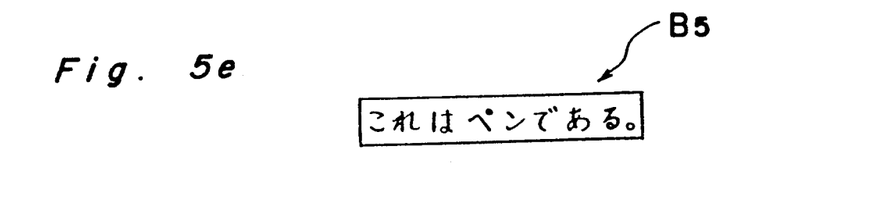

Thereafter, in the target sentence generating portion 54, postpositional words each functioning as an auxiliary to a main word, according to the Japanese grammar, are added to complete the translation into Japanese. The translation as completed is stored in the buffer B5 as shown in FIG. 5e, and is outputted from the translation module 5.

Figure 6:
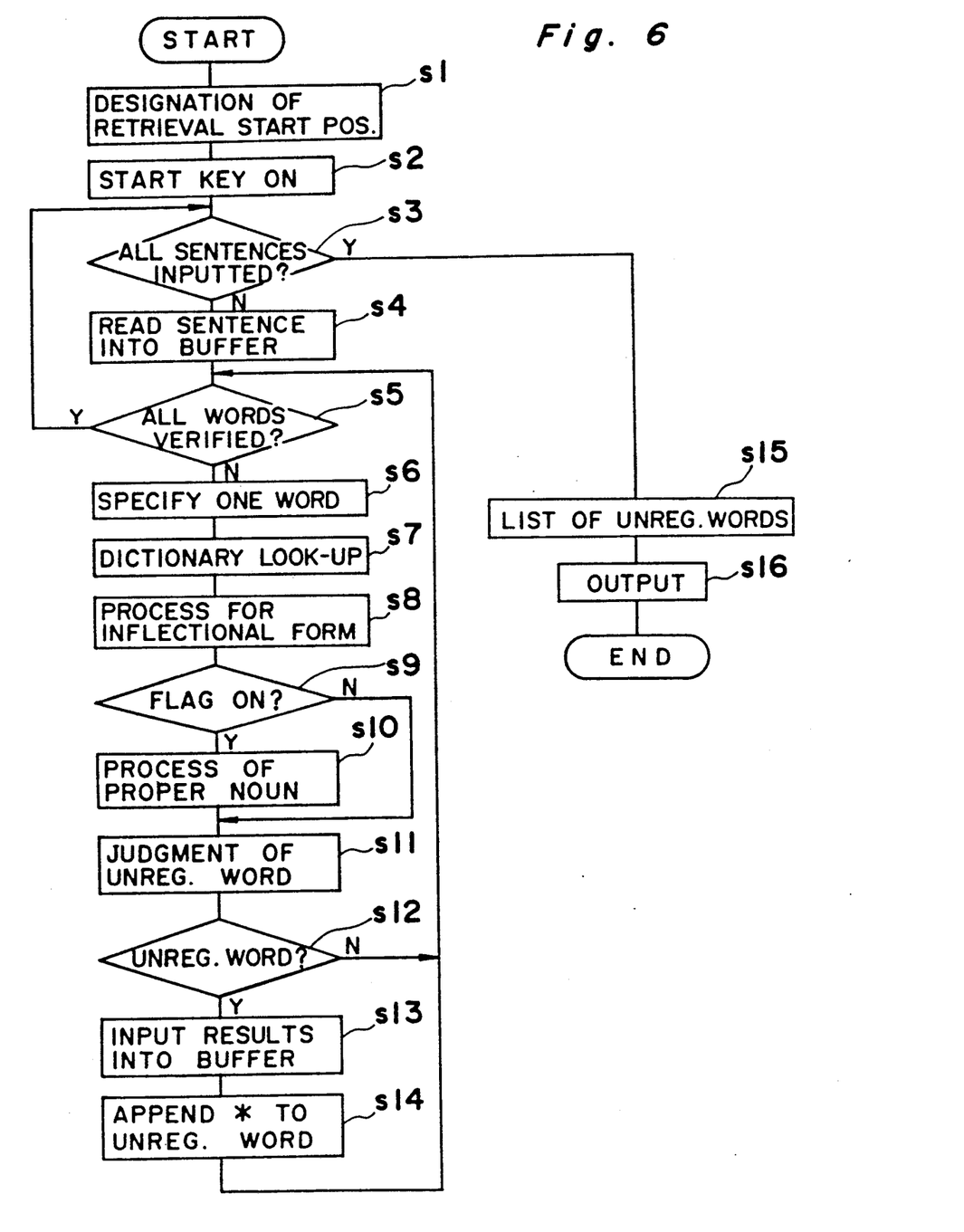
FIG. 6 is a flow-chart showing the batch processing for collectively retrieving unregistered words contained in inputted sentences according to a first function of the translation apparatus of the present invention.

Referring next to a flow-chart as shown in FIG. 6, batch processing required for collectively retrieving or searching unregistered words will be explained in detail hereinafter, which is a first function of the translation apparatus of the present invention.

It is now assumed that a sentence to be inputted as an object has already been read into the translation apparatus and indicated on the display 3.

At step S1, a certain position in the sentence from which the retrieval is caused to start is initially designated.

An operator can generally execute the aforementioned position designating process by moving a cursor, making reference to the contents indicated on the display 3.

In the case where a whole sentence or sentences should be retrieved, the cursor is rendered to locate immediately before the sentences.

At step S2, a start key is depressed to start the batch processing for collectively retrieving all of the unregistered words. A function key provided on the keyboard 4 is assigned to act as the start key.

The main process required for the retrieval of the unregistered words starts from step S3, at which it is judged whether or not one whole sentence to be retrieved has been inputted. When it has been judged at step S3 that the input of all sentences to be retrieved has been completed, the procedure proceeds to step S15 which will be explained later.

On the contrary, in the case where it has been judged that there still exists one or more words left unretrieved in the sentence, the procedure proceeds to step S4, at which the inputted whole sentence is read into a buffer for this process.

As a result, each word contained in the sentence is judged whether or not it is known or has been registered. Generally, all of the words are successively verified from the first word to the last one, with respect to a dictionary or dictionaries for translation.

At step S5, it is judged whether or not all of the words have been completely verified. In the case where the verification of all words has been completed, the procedure returns to step S3 to read the next sentence In the case where it has been judged at step S5 that there still exists a word or words left unverified in the sentence, the procedure proceeds to step S6 at which a certain word to be retrieved is specified.

At subsequent step S7, the specified word is verified with respect to the contents of the translation dictionaries.

Although a plurality of dictionaries are available as the above translation dictionaries, it is assumed that necessary dictionaries have selectively been inputted into the apparatus by the operator in advance prior to the commencement of this process.

At steps S8 through S10, the verification of the unregistered word is executed by using the dictionaries.

The process for any possible inflectional form of a noun, a verb or the like to be executed at step S8 corresponds to the verification with respect to the dictionaries also including inflectional forms derivative from an original form of any possible word, for example, the plural form, the third person singular present form, the past form, the past participle form, the present participle form, or the like in English. It is also possible to execute the verification including, for example, a prefix and a suffix by further enhancing the level of the process.

Steps S9 and S10 relate to the process for dealing with a proper noun or the like in English.

It goes without saying that the proper noun is likely to be the unregistered word. For example, a word "Tanaka (a family name of a Japanese)" is now considered. In the case where there exists no such word in the translation dictionaries, it is initially judged as an unregistered word. This kind of word is processed in either of two different ways. In one way, this word is added as the unregistered word to a list of unregistered words which will be explained below. Alternatively, this word is presumed to be a proper noun and is left as it is so that it may not be further processed. In order to select either of these two ways, a flag is provided to be set by the operator prior to the commencement of this function. in the case where the former has been selected, "Tanaka" is registered as "田中" in a user dictionary. It is considered that this case is requested for obtaining a detailed translation. On the contrary, in the case where the latter has been selected, it is considered that the translation of "Tanaka" simply into a noun "Tanaka" is fully available in translating the sentence including such a word. An algorithm for presuming any proper noun, which is provided in each translation apparatus, can be utilized in the proper noun processing of this function.

At step S9, it is judged that the flag is ON or OFF. If the flag is ON (Yes), the word presumed as the proper noun is processed as an unregistered word at step S10.

When it has been judged at step S9 that the flag is OFF (NO), the procedure directly proceeds to step S11 at which the unregistered word is judged.

Depending on a result of the judgment, the procedure proceeds to step S13 followed by step S14 or returns to step S5 from which a new word of the next object is processed.

At step S13, the information of the word such as its spelling, location in the sentence or the like is additionally inputted into the buffer storing the results. A mark or marks indicative of the unregistered word are appended to this word at step S14 so that the unregistered word may be clearly indicated in the inputted sentence.

Step S14 is provided for readily finding the unregistered word in the case where the inputted sentence is displayed or printed. Accordingly, the process at this step may be eliminated, depending on the translation apparatus.

Upon progress of the above described process, when it has been judged at step S3 that the process for all sentences has been completed, the procedure directly proceeds to step S15 at which the list of the unregistered words is drawn up by classifying, arranging or editing the contents (cumulative total data of the unregistered words) of the buffer storing the results in a form that is easily readable. It is considered that this kind of list includes the number of the words counted as the unregistered words, the identification of their locations in the sentence and the like, and the words in this list may be sorted or classified in an alphabetical order on the basis of their spellings.

At step S16, the list of the unregistered words is outputted on the CRT display 3 or may be printed by a printer.

In accordance with the above described flow-chart, the successive process according to the first function of the present invention is completed.

Figure 7:
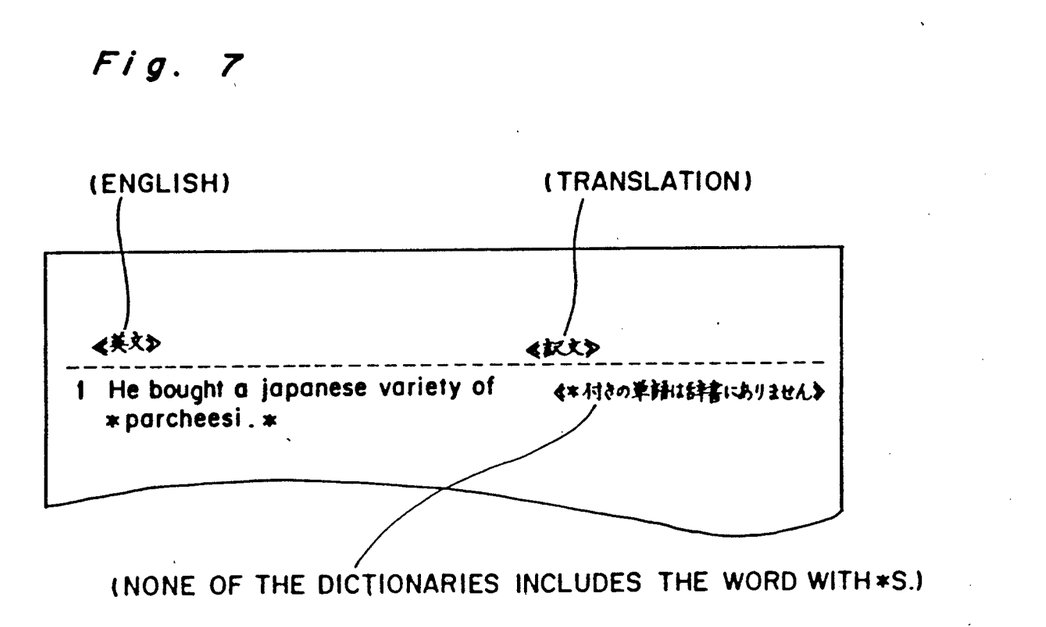
FIGS. 7 and 8 are views each showing an example indicating therein the unregistered word.

FIG. 7 illustrates one example obtained as a result of this function. In this example, a word "parcheesi" is the unregistered word, since there exists no such a word in any dictionary. Accordingly, this word is sandwiched between the marks (*) indicative of the an unregistered word as described at step S14. Furthermore, a comment 「＊付きの単語は辞書にありません。」 (This means that none of the dictionaries includes the word with *'s.) for clearly indicating the presence of the unregistered word is presented on an area for the translation.

Figure 8:
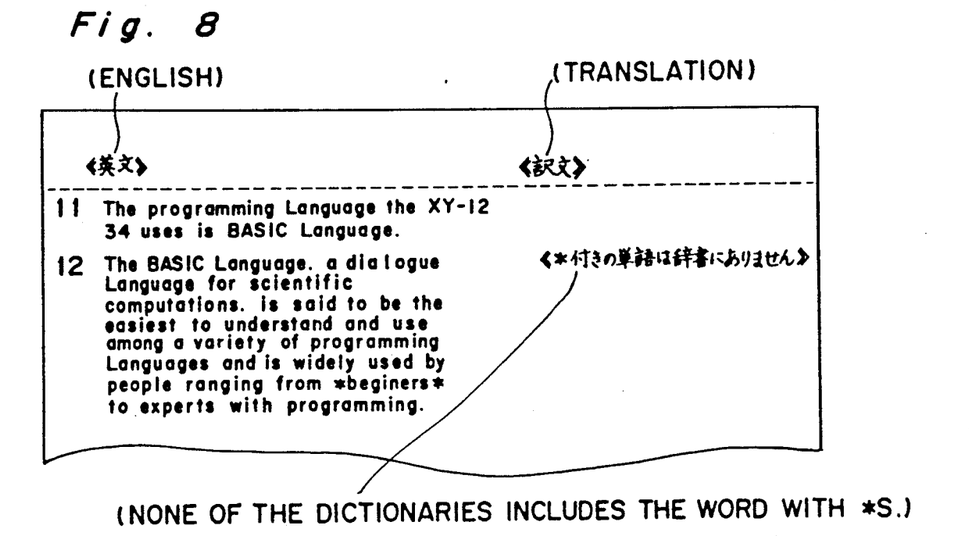

FIG. 8 shows another example obtained as a result of this function. In this example, a word "beginers" has been retrieved as the unregistered word, since this word is erroneously spelled (This word should be spelled as "beginners"). Needless to say, it is possible to deal with a word "BASIC" as the unregistered word by utilizing the flag required for the process of the proper noun, as described so far.

Figure 9:
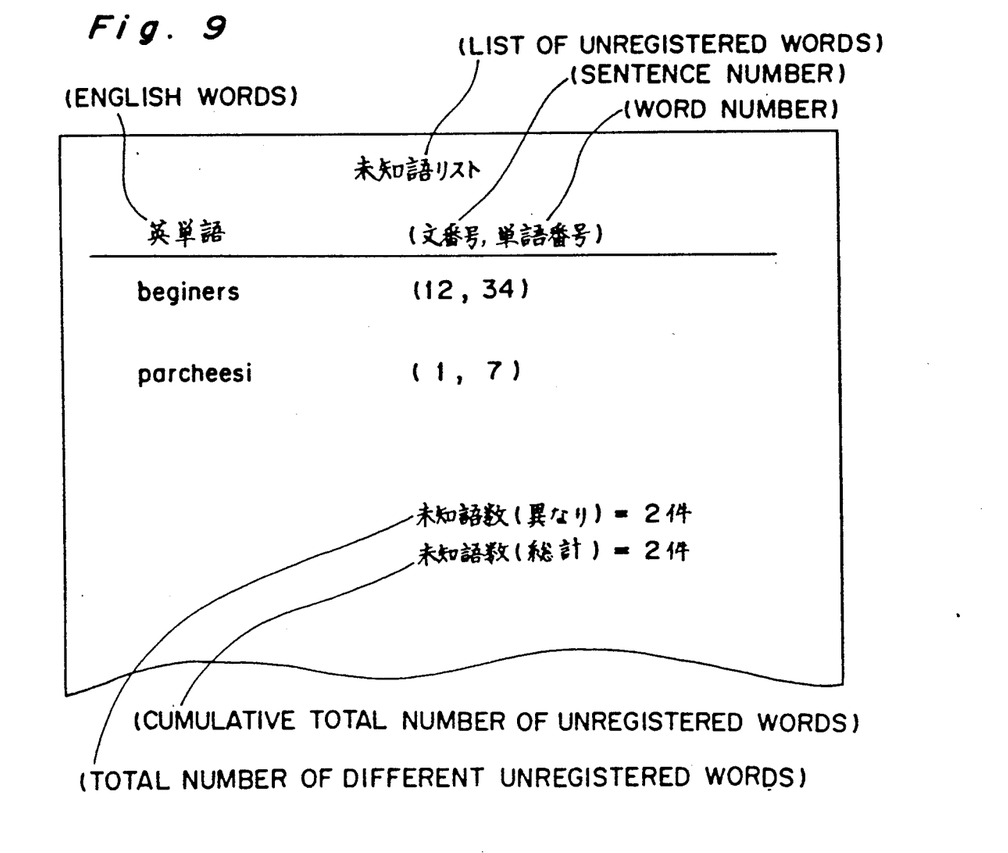
FIG. 9 is a view showing a list of the unregistered words.

FIG. 9 illustrates one example of the list of the unregistered words. The unregistered words are sorted in alphabetical order on the basis of their spellings. There is indicated in the list of the unregistered words, the information such as the number of the sentence including the identified unregistered word; the number of the unregistered word which is counted from the first word of the sentence or the like; the cumulative total number of the unregistered words contained in all of the sentences which have been retrieved; the total number of different unregistered words contained in the translation; or the like. Depending on the use of the list, it is possible to indicate a unregistered words in the list in the order of their appearance that is, in the order of the sentence number), in the order from the most occurrence of the unregistered words or the like, in place of the alphabetical order.

If the unregistered words are registered in the user dictionary by making use of such a list, it is possible to execute the translation in high efficiency. Moreover, when the list of the unregistered words is called in the case of registering then in the user dictionary so that the spelling of the unregistered word may be utilized, the manual input is desirably reduced, thus resulting in that the labor during the registering process can be also reduced.

According to this function of the translation apparatus of the present invention, prior to the translation, all of the unregistered words contained in the sentence or sentences are collectively retrieved and the results of the retrieval are edited together with the useful information such as the number of the unregistered words, their locations in the sentence or the like so that the operator may be informed of such results. Accordingly, since a measure such as the registering of them in the user dictionary and the like can be collectively carried out, the operation can be readily executed in high efficiency.

As described so far, according to the first function of the translation apparatus of the present invention, the following effects can be obtained:

(1) Since the words which have not been registered in any dictionary for translation can be collectively registered in the user dictionary by using the words contained in the inputted sentence, the operating efficiency is desirably improved.

(2) Since the user is informed of the locations of the unregistered words, the sentence number and the like in advance, such information can serve as a good reference in deciding the equivalents corresponding to respective unregistered words in the case where the unregistered words are being registered in the user dictionary, thus resulting in that a translation with high quality can be obtained.

(3) The batch processing for retrieving the unregistered words, the registering in the user dictionary and the translation process can be separated from each other, and accordingly, a plurality of persons can attend to the operation for translation, that is, it is feasible to divide the above process in accordance with its level.

(4) In the case where the inputted sentences are of English sentences or the like and when a functional level of the batch processing for retrieving the unregistered words is altered, the proper nouns each including at least one big letter or the like can be recorded in the list of the unregistered words. As a result, the detailed translation can be obtained by registering them in the user dictionary.

(5) If the words which have been recorded in the list of the unregistered words during the retrieval thereof are stored in some way and called in case of the registering them in the user dictionary, the registering can be effectively carried out.

(6) Since the words which have been erroneously inputted are caused to be the unregistered words, it is possible to correct such words in advance.

Figure 10:
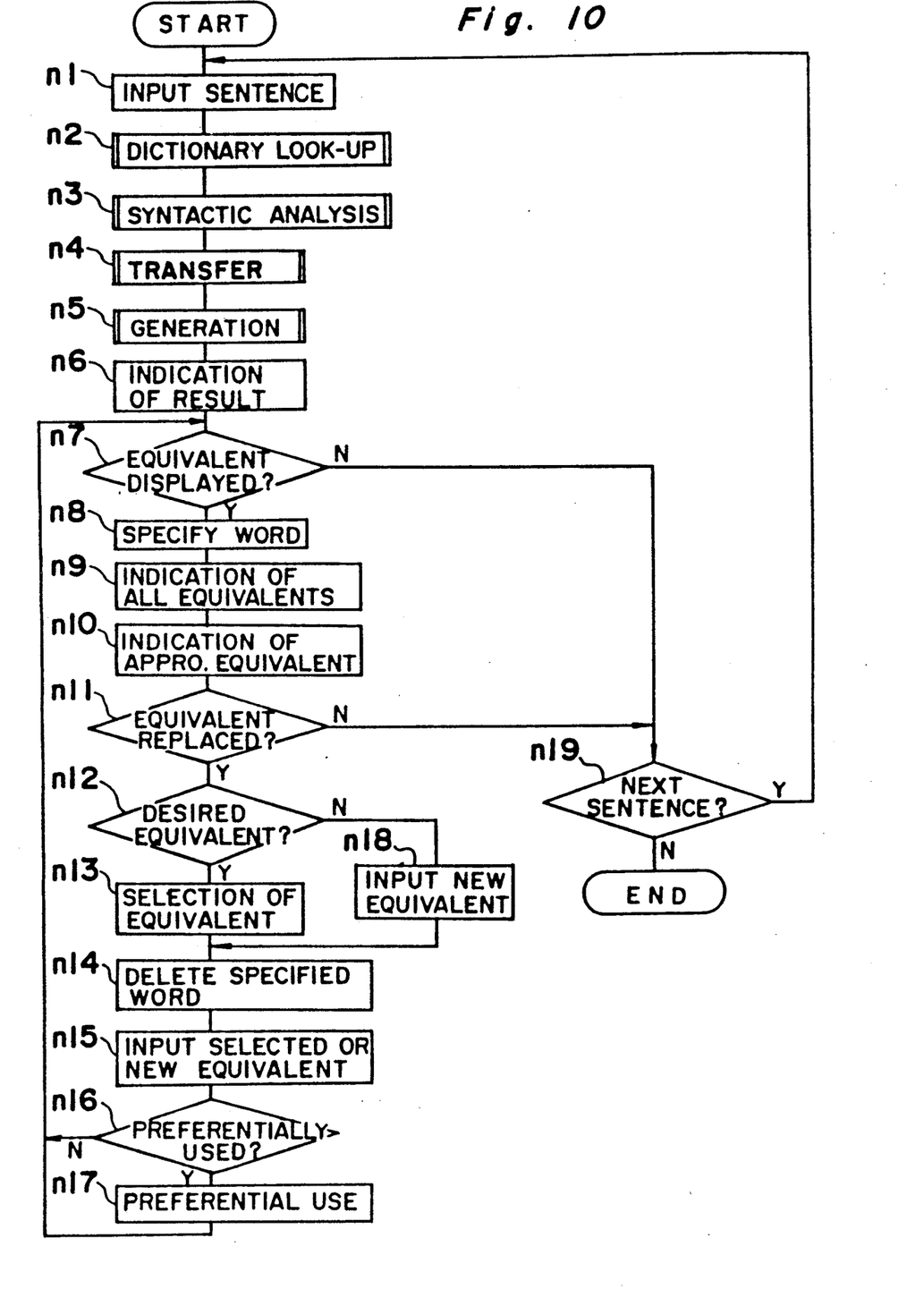
FIG. 10 is a flow-chart showing the process for replacing one word to another according to a second function of the translation apparatus of the present invention.

Referring next to a flow-chart as shown in FIG. 10, the process for replacing one word by another one in a translated sentence will be explained in detail below, which is a second function of the translation apparatus of the present invention.

At step n1, when one English sentence "This computer has a 64K bytes memory." including a plurality of registered words is initially inputted into the apparatus, the dictionary look-up and morphological analysis is executed at step n2 so that the first combination of parts of speech corresponding to respective words may be set, with an appropriate part of speech being selected with respect to each word having a plurality of parts of speech.

The syntactic analysis is carried out at step n3 with respect to a row of parts of speech set in the above manner.

When the syntactic analysis has been successfully completed, the procedure proceeds to step n4 at which the language transfer is executed, followed by step n5 at which the target language is generated. At subsequent step n6, a translation result 「このコンピュータは 64K バイトの記憶を持っている。」 is generated on the basis of Japanese equivalents corresponding to the parts of speech used in the syntactic analysis and the translation result is indicated on the display 3.

At step n7, the user judges whether or not all of the Japanese equivalents corresponding to a certain English word contained in the inputted sentence should be displayed. When not to display has been selected, it is judged at step n19 whether or not there exists a next sentence to be translated. When it has been judged that a sentence does not exist, the procedure ends. On the contrary, in the case where it has been judged that there still exists another sentence, the procedure returns to step n1 from which the translation process is carried out with respect to the next sentence.

On the other hand, when the display of all of the Japanese equivalents is requested at step n7, the procedure proceeds to step n8 at which a desired word, for example, the word "memory" is specified. At subsequent step n9, all of the Japanese equivalents obtained from the dictionary are indicated as shown in FIG. 11.

Furthermore, only the Japanese equivalent (the word 「記憶」 in this case) in the translated sentence corresponding to the specified English word is indicated at step n10.

At step n11, it is judged whether or not the equivalent indicated at step n9 is replaced by a new Japanese equivalent.

Figure 11:
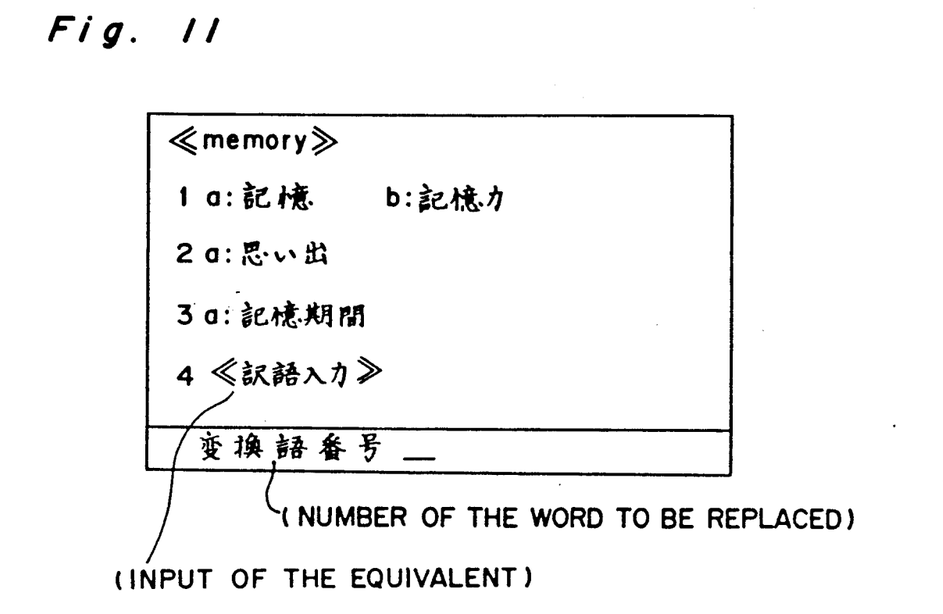
FIG. 11 is a view showing an example indicated on a screen, of a plurality of equivalents contained in a dictionary and corresponding to one inputted word.

In the case where the replacement has not been requested at step n11, the procedure is caused to proceed to step n19 by simply operating a return key, with the display shown in FIG. 11 being indicated as it is.

On the other hand, in the case where the replacement has been requested at step n11, it is judged at step n12 whether or not there exists any desired Japanese equivalent in the dictionary.

When it has been judged at step n12 that the dictionary contains the desired equivalent, the procedure proceeds to step n13 at which the desired equivalent to be substituted for the former equivalent used in the translated sentence is selectively set. In case of FIG. 11, for example, "1b" or the like is inputted.

When it has been judged at step n12 that the dictionary does not contain any desired equivalent, the procedure proceeds to step n18 at which a new Japanese equivalent is inputted.

Figure 12:
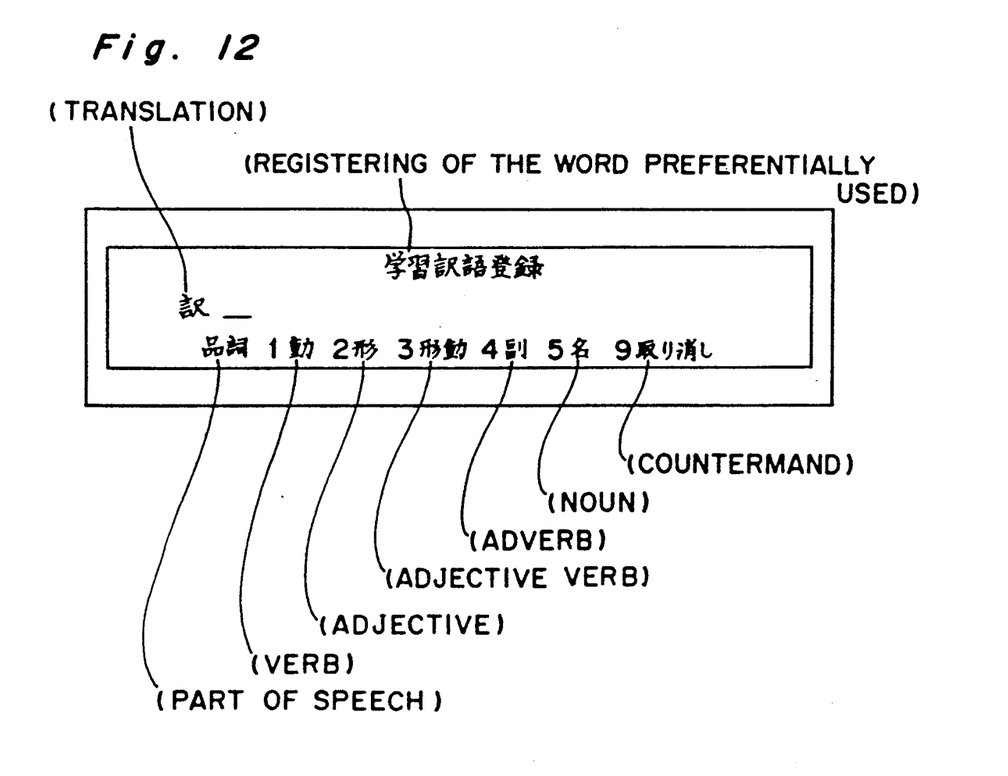
FIG. 12 is a view showing another example indicated on a screen, in the case where a new desired equivalent is inputted.

In the case where the new equivalent is requested, "4" is inputted in FIG. 11. As a result, the display as shown in FIG. 12 appears, thus enabling the input of the new equivalent.

As described above, when the desired equivalent to replace the former equivalent is selected or the new equivalent is inputted, the indicated former equivalent is deleted at step n14 and replaced by the selected equivalent or the inputted new one at step n15.

Thereafter, whether or not the new equivalent designated or inputted at step n16 should be preferentially used from that time on is confirmed by the user. Only in the case where this equivalent is preferentially used, the procedure returns to step n7 through step n17. Step n16 may be deleted, since the preferential use of the new equivalent once replaced occasionally produces some inconvenience (depending upon a sentence structure to be used), as different from that in a word processor or the like.

From the foregoing, according to the second function of the translation apparatus of the present invention, even in the case where a group of the registered words contain no desired equivalent, it is not necessary to correct the dictionary or dictionaries by making use of the function of the user dictionary, that of dictionary edit or the like. Accordingly, since the replacement between two words can be executed during the same phase as the translation process, the labor to be imposed on the user can be desirably reduced.

It is to be noted that in the above described embodiment, although the explanation has been made with reference to the translation from English into Japanese, the present invention is not limited thereby, but is applicable to the translation from Japanese into English or that between other pair of languages.

Although the present invention has been fully described in connection with its preferred embodiment with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A translation apparatus for translating an inputted sentence of an original language into a sentence of a target language and for outputting the translated sentence as an outputted sentence, comprising:

indicating means for indicating a selected word contained in the inputted sentence;

dictionary means for storing words corresponding to words of the original language and the targe language;

output means, operatively connected to said dictionary means and said indicating means, for outputting translated equivalent words of the target language from said dictionary means corresponding to said selected word;

input means, operatively connected to said output means, for inputting a desired translated equivalent word correspondign to said selected word, said desired translated equivalent word not being part of the output of said output means;

replacing means, operatively connected to said output means and said input means, for replacing the translated equivalent of said selected word contained in the translated sentence with a translated equivalent word selected from the outputted translated words of said dictionary means or with said new translated equivalent word inputted by said input means; and means, operatively connected to said replacing means, for preferentially using said translated equivalent word used by said replacing means during future translation processes.

2. A method for translating a sentence of an original language into a sentence of a target language, comprising the steps of:
(a) inputting a sentence to be translated;
(b) translating the inputted sentence of said step (a);
(c) displaying a selected word from the inputted sentence of said step (a);
(d) displaying translated equivaeltns of the selected word of said step (c);
(e) selecting either one of the translated equivalent of said step (d) or a new equivalent inputted by an user to replace the selected word of said stpe (c), thereby properly translating the selected word;
(f) determining if the selected equivaeltnf os tep (e) is to be a preferred equivalent for future translations; and
(g) repeating said steps (c) through (f) until all selected words have a selected equivalent.

3. A translation apparatus for translating an inputted sentence of an original language into a sentence of a target language and for outputting the translated sentence as an outputted sentence, comprising:
indicating means for indicating a selected word contained in the inputted sentence;
dictionary means for storing words corresponding to words of the original language and the target language;
output means, operatively connected to said dictionary means and said indicating means, for outputting translated equivalent words of the target language from said dictionary means corresponding to said selected word;
input means, operatively connected to said output means, for inputting a desired translated equivalent word corresponding to said selected word, said desired translated equivalent word not being part of the output of said output means;
replacing means, operatively connected to said output means and said input means, for replacing the translated equivalent of said selected word contained in the translated sentence with a translated equivalent word selected from the outputted translated words of said dictionary means or with said new translated equivalent word inputted by said input means; and
means, operatively connected to said replacing means, for using said translated equivalent word used by said replacing means during future translation processes.

4. A method for translating a sentence of an original language into a sentence of a target language, comprising the steps of:
(a) inputting a sentence to be translated;
(b) translating the inputted sentence of said step (a);
(c) displaying a selected work from the inputted sentence of said step (a);
(d) displaying translated equivalents of the selected word of said step (c);
(e) selecting either one of the translated equivalent of said step (d) or a new equivalent inputted by an user to replace the selected word of said step (c), thereby properly translating the selected word;
(f) determining if the selected equivalent of step (e) is to be an equivalent for future translations; and
(g) repeating said steps (c) through (f) until all selected words have a selected equivalent.

* * * * *